United States Patent
Lo et al.

(10) Patent No.: US 7,515,741 B2
(45) Date of Patent: Apr. 7, 2009

(54) ADAPTIVE FINGERPRINT MATCHING METHOD AND APPARATUS

(75) Inventors: Peter Z. Lo, Lake Forest, CA (US); Behnam Bavarian, Newport Coast, CA (US)

(73) Assignee: Motorola, Inc., Schaumburg, IL (US)

( * ) Notice: Subject to any disclaimer, the term of this patent is extended or adjusted under 35 U.S.C. 154(b) by 295 days.

(21) Appl. No.: 11/031,223

(22) Filed: Jan. 7, 2005

(65) Prior Publication Data

US 2006/0153432 A1 Jul. 13, 2006

(51) Int. Cl.
*G06K 9/00* (2006.01)
(52) U.S. Cl. ...................................... 382/124
(58) Field of Classification Search .................. 382/124, 382/125
See application file for complete search history.

(56) References Cited

U.S. PATENT DOCUMENTS

| 5,465,303 | A |   | 11/1995 | Levison et al. |
| 5,613,014 | A | * | 3/1997 | Eshera et al. ............... 382/124 |
| 5,796,857 | A |   | 8/1998 | Hara |
| 5,815,252 | A |   | 9/1998 | Price-Francis |
| 5,926,555 | A | * | 7/1999 | Ort et al. .................... 382/124 |
| 5,960,101 | A | * | 9/1999 | Lo et al. ..................... 382/125 |
| 6,072,891 | A |   | 6/2000 | Hamid et al. |
| 6,181,807 | B1 |  | 1/2001 | Setlak et al. |
| 6,633,882 | B1 |  | 10/2003 | Fayyad et al. |
| 6,941,003 | B2 |  | 9/2005 | Ziesig |
| 6,973,206 | B2 | * | 12/2005 | Lo .............................. 382/124 |
| 7,155,039 | B1 |  | 12/2006 | Lo |
| 2003/0031348 | A1 | | 2/2003 | Kuepper |
| 2004/0062426 | A1 | | 4/2004 | Lo |

FOREIGN PATENT DOCUMENTS

EP 0650137 A2 4/1995

OTHER PUBLICATIONS

Prabhakar, et al. "Decision-Level Fusion in Fingerprint Verification", 2001, Springer-Verlag Berlin Heidelberg, pp. 88-98.

* cited by examiner

*Primary Examiner*—Matthew C Bella
*Assistant Examiner*—Dennis Rosario
(74) *Attorney, Agent, or Firm*—Valerie M. Davis

(57) ABSTRACT

A method for fingerprint record identification includes the steps of: assigning (200) a first number of fingers for a first matching stage and a second number of fingers for a second matching stage; performing (210) the first matching stage of comparing, based on the first number of assigned fingers, a search record to at least a portion of a plurality of file records and generating first matching results of a subset of the at least a portion of the plurality of file records; and performing (220) the second matching stage of comparing, based on the second number of assigned fingers, the search record to at least a portion of the subset and generating second matching results of one of: a strong hit; a weak hit; no hit; and a an ordered portion of the subset.

15 Claims, 3 Drawing Sheets

ADAPTIVE FINGERPRINT MATCHING METHOD AND APPARATUS

CROSS-REFERENCE TO RELATED APPLICATIONS

The present application is related to the following U.S. application commonly owner together with this application by Motorola, Inc.:

Ser. No. 10/834,618, filed Apr. 29, 2004, titled "Method and System for Quality Based Fingerprint Matching" by Peter Zhen-Ping Lo and claiming priority from Provisional Application Ser. No. 60/533,031 filed Dec. 29, 2003.

FIELD OF THE INVENTION

The present invention relates generally to automatic fingerprint identification systems, and more specifically to a method and apparatus for ten-print identification using a dynamically selected number of fingers for each matching stage in the process.

BACKGROUND OF THE INVENTION

Identification pattern systems, such as ten print or fingerprint identification systems, have played a critical role in modern society in both criminal and civil applications. For example, criminal identification in public safety sectors is an integral part of any present day investigation. Similarly in civil applications such as credit card or personal identity fraud, print identification has become an essential part of the security process.

The automatic fingerprint identification operation normally consists of two stages. The first is the registration or enrollment stage and the second is the identification, authentication or verification stage. In the enrollment stage, an enrollee's prints and personal information are enrolled and matching features of the enrolled prints are extracted. Such matching features may include, but are not limited to, a classification of each print as one of four major print types (i.e., arch, left loop, right loop, and whorl) as well as minutiae which have respective X-Y coordinate positions and angles of orientation as is well known in the art.

The personal information and the extracted features, and perhaps the images, are then typically used to form a file record that is saved into a file database for subsequent identification of the enrollee. Present day automatic fingerprint identification systems may contain several hundred thousand to several million of such file records. In addition, one or more prints from an individual or a latent print may be obtained and matching features extracted from each print and, along with personal information, formed into what is typically referred to as a search record.

The search and file records may be processed, for instance, from unsolved latent prints, ten prints, a set of finger prints, slap prints, palm prints, etc. An unsolved latent print is typically defined as a finger or palm print lifted from a crime scene or unknown source whose owner is unknown. A ten-print or set of fingerprints generally means a set of 10 or less fingerprints that may have been taken from a person by either the rolled or flat method of capturing the prints in a media. A slap print is the literal slapping of the user's inked hands onto a media or the literal slapping of the user's hands onto a fingerprint capture sensor. Typically, the prints are processed to produce an active search record against which filtered file records processed from a file database is compared. It is understood that ten prints may include toe or palm prints as well.

In the identification stage, the search record is compared with the enrolled file records in the database of the fingerprint matching system. In a typical search scenario, a search record may be compared against millions of file records that are stored in the database and a list of matched scores is typically generated as a result of this matching process. Candidate records are sorted according to matched scores. A matched score (also referred to herein as a similarity score) is a measurement of the similarity of the print features of the identified search and file records. Typically, the higher the score, the more similar the file and search records are determined to be. Thus, a top candidate is the one that has the closest match.

More specifically, a known fingerprint identification system conceptually performs two stages of matching and three stages of decision-making. The two stages of matching are the minutiae matching stage (have two integrated stages or processes of registration and scoring) and the enhanced matching stage (wherein more detailed matching and scoring is performed). The three stages of decision-making are the minutiae matcher intelligent decision logic (e.g., IDL1), the enhanced matcher intelligent decision logic (e.g., IDL2), and a hybrid final intelligent decision logic (e.g., IDL3).

For ten-print matching, for instance, for a given pre-determined number of assigned fingers, the minutiae matcher in its registration stage aligns and compares a fingerprint in the search record to the corresponding fingerprint of a file record to find a set of mated minutiae for the compared prints. In the minutiae matching scoring stage, a score is calculated based on the mated minutiae for that compared fingerprint pair. For all the compared file records of the compared fingers, a list of scores is created to form a match report. The sorted match reports for each compared finger are generated based on the same given number of assigned fingers, which are then sent to IDL1 to make a first stage decision.

If no candidate file record (also referred to herein as a candidate record and a candidate) is detected as a hit or a candidate record is detected as a weak hit, a more detailed secondary matching using more orthogonal information, i.e., the enhanced matching, is conducted on the top N mated candidate records (wherein N may be for instance 100 or 200) to boost a mated candidate score. The same pre-determined number of assigned fingers is also used for this secondary matching. If no candidate is detected as a hit or a candidate is detected as a weak hit, the top "L" candidates are sent to the IDL3 stage, which combines both the minutiae match and detailed match results to make the final decision.

One shortcoming of the above system is that the same number of fingers is used in the registration and scoring stages of minutiae matching. Another shortcoming is that the same number of candidate file records is used in the registration and scoring stages of minutiae matching. It is well known that the greater the number of fingers used in matching, the more accurate the system. However due to speed and cost considerations, the number of fingers used in the matching is normally limited, for example to four to six, and the rest of fingers in the ten-print record are not used in the matching even though in theory they may provide extra orthogonal information to improve accuracy.

Thus, there is an ever-existing need for improving the speed and reducing the cost of fingerprint identification systems without sacrificing the accuracy of the system.

BRIEF DESCRIPTION OF THE FIGURES

A preferred embodiment of the invention is now described, by way of example only, with reference to the accompanying figures in which.

DETAILED DESCRIPTION OF THE INVENTION

Figure 1:
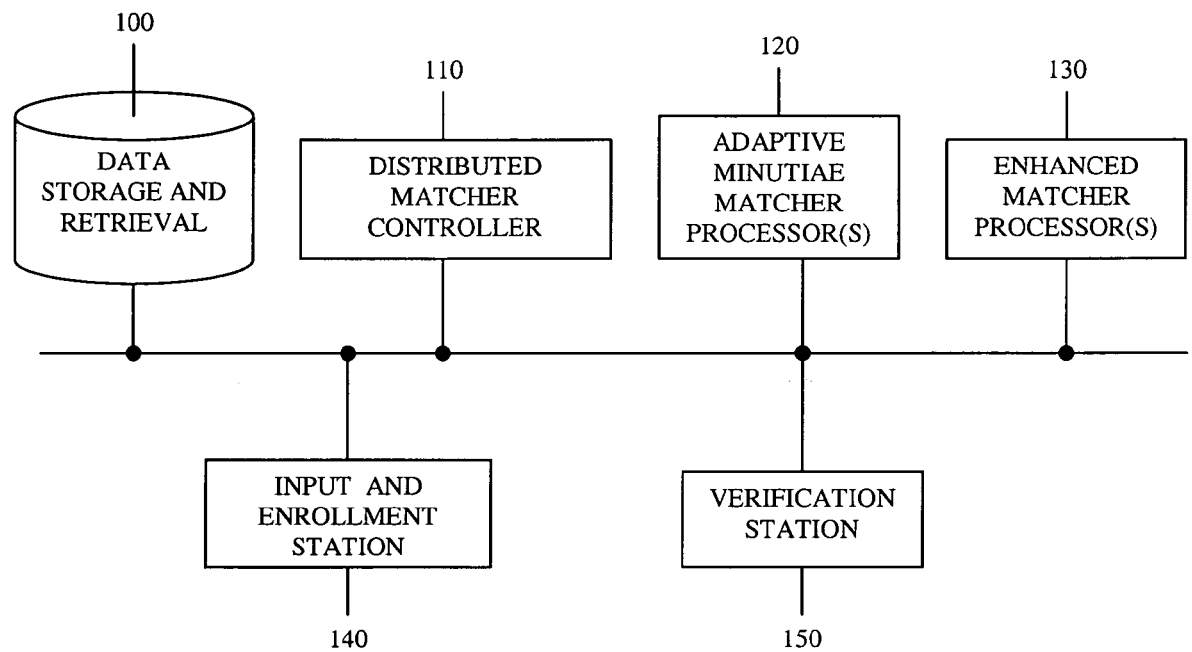
FIG. 1 illustrates a high level block diagram of an automatic fingerprint identification system in accordance with an embodiment of the present invention.

While this invention is susceptible of embodiments in many different forms, there are shown in the figures and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. It will also be appreciated that for simplicity and clarity of illustration, common and well-understood elements that are useful or necessary in a commercially feasible embodiment may not be depicted in order to facilitate a less obstructed view of these various embodiments. Also, elements shown in the figures have not necessarily been drawn to scale. For example, the dimensions of some of the elements are exaggerated relative to each other. Further, where considered appropriate, reference numerals have been repeated among the figures to indicate corresponding elements.

In FIG. 1 an automatic fingerprint identification system (AFIS) that may be used to incorporate the various embodiments of the present invention described herein is shown and indicated generally at 10. System 10 ideally includes an input and enrollment station 140, a data storage and retrieval device 100, a distributed matcher controller 110, at least one adaptive minutiae matcher processor 120 (also referred to herein as a coarse minutiae matcher processor), at least one enhanced matcher processor 130 and a verification station 150.

The functionality of input and enrollment station 140 and the distributed matcher controller 110 in accordance with the various embodiments of the present invention may be implemented, for instance, in a suitable processor programmed with instructions stored in a suitable storage or memory device, such as a Random Access Memory (RAM) or a Read Only Memory (ROM) or some combination thereof. The adaptive minutiae matcher processor(s) and enhanced minutiae processor(s) may each be implemented, for instance, in a suitable processor programmed with instructions stored in a suitable storage or memory device or in a plurality of logic devices that may be implemented in an Application Specific Integrated Circuit (ASIC), or some combination thereof. Moreover, data storage and retrieval device 100 may be any suitable storage device such as a database.

Those skilled in the art, however, will recognize that the specifics of this illustrative example are not specifics of the invention itself and that the teachings set forth herein are applicable in a variety of settings. For example, since the teachings described do not depend upon the type of "prints" being matched, they can apply to any prints such as toe prints, palm prints, etc., although fingerprints are described with respect to this particular embodiment. As such, other alternative implementations of using different types of prints are contemplated and are within the scope of the various teachings described and are within the scope of the term "fingerprint" as used herein.

Input and enrollment station 140 is used to capture a fingerprint (also referred to herein as a "print") and to optionally extract the relevant matching features of that print for later comparison. File records may also be generated in the input and enrollment station 140 from the captured prints and extracted features. In the input and enrollment station 140, the enrolled prints (also referred to herein as print images) may be segmented and quality is assigned to each print to ensure that the print is of sufficient quality to be matched.

The integrity of fingerprints may also be checked to ensure that each print image was captured in accordance with one or more capture guidelines. For instance, the integrity of fingerprints can be checked by a slap to roll comparison to determine whether each rolled print was correctly positioned, labeled and segmented. An active file record may be generated from prints having sufficient quality, as controlled by a pre-determined quality threshold, and passive file records may be generated from, for instance, prints whose quality are insufficient or from duplicate prints.

Input and enrollment station 140 may also be used to capture a fingerprint and to optionally extract the relevant matching features of that image for comparison with matching features in one or more file records. A search record may also be generated in the input and enrollment station 140 from the captured images and extracted features. In the input and enrollment station 140, the enrolled search prints may likewise be segmented and quality assigned to each print. The integrity of fingerprints may also be checked. An active search record may be generated from prints having sufficient quality. Otherwise, the prints may be re-enrolled (i.e., one or more additional prints captured and their quality analyzed), and an active search record extracted from all of the enrolled prints. Thus, input and enrollment station 140 may be coupled to, for instance, flat bed scanners, a ten-print live scanner and a digital camera, which may be used to scan prints or capture latent prints that may be loaded into a suitable processor such as, for instance, a microprocessor that may also be coupled to or incorporated within the input and enrollment station 140 for performing its remaining functions.

Data storage and retrieval unit 100 stores and retrieves the file records, including the matching features, and may also store and retrieve other data useful to carry out the present invention. Adaptive minutiae matcher processors 120 and enhanced matcher processors 130 typically use the extracted matching features of the prints to determine similarity or may be configured to make comparisons at the image level.

Typically, the adaptive (or coarse) minutiae matcher processor(s) 120 has two stages, a registration stage and a scoring stage. In the minutiae matcher registration stage, for a search print having a minutiae pattern formed by a set of identified search print minutiae and a given enrolled file print having a minutiae pattern formed by a set of identified file print minutiae, one of the minutiae patterns is rotated and translated with respect to the other minutiae pattern. This is to facilitate "lining up" the two minutiae patterns so that the corresponding features (or mated minutiae) can be determined. In particular, X-Y coordinates and angles of orientation of minutiae in the search print are compared against X-Y coordinates and angles of rotation in the file print in order to determine which file prints are possible matches for the search print. This minutiae pattern line-up or registration process is functionally identical to a two-dimensional discreet pattern correlation process wherein one pattern is placed on top of another, the number of corresponding features are counted, a correlation matrix element is incremented, the pattern is shifted a small increment, the corresponding features are counted, etc., until the "best" alignment is achieved.

In the minutiae matcher scoring stage, for a given search print a score for each search minutiae that has a mating filed minutiae is determined based on the number of neighboring search minutiae that also have a mating file minutiae. This individual minutiae score may, for example, be determined as a function of the number of neighboring search minutiae such as, for instance, the square of the number of neighboring search minutiae that have a mating file minutiae. A final raw match score for a given finger may then be determined that may be, for instance, the sum of the scores for the individual search minutiae. In a multi-finger search (e.g., a card-to-card search or a latent search where minutiae from more than one finger are used, such as in accordance with various embodiments of the present invention) the scores for each finger can be combined in some suitable manner to give a card or multi-finger match score.

In the various embodiments of the present invention, as described in more detail below, the registration and scoring stages of the minutiae processor(s) are separated into two modules to achieve greater speed in the matching process without sacrificing accuracy. The increased speed and the maintenance or enhancement of accuracy is accomplished in a ten-print matching process by using a different number of fingers and different number of candidate file records for each of the two stages.

For ten-print matching, the input to the enhanced matcher processor(s) 130 is typically the search record and a match report (e.g., matching results) that may generally comprise an ordered list of candidate file records, typically based upon the scores determined in the scoring stage of the adaptive minutiae processor(s) 120, wherein those file records associated with higher scores are included in the list. Enhanced matcher processor(s) 130 then perform (for at least a portion of the file records on the list and for each assigned finger) a more detailed/complex matching process using additional orthogonal information to compare the search print to the file print. Such additional orthogonal information may include, but is not limited to, the relationship of the mated minutiae to each other and to cores and deltas, number of ridges, ridge traces, mated minutiae ridge properties, classification types, etc.

The matching results are typically an accurate and much smaller ordered list of candidate file records than is generated by the minutiae matcher processor(s) alone, wherein the scores of some of the records in the ordered list from the adaptive minutiae matcher processor(s) 120 may be "boosted" or moved up in the list using the more detailed matching of the enhanced matcher processor(s). As will be explained in more detail below, in a ten-finger matching process an even greater number of fingers may be used in the enhanced matching process (than in both stages of the adaptive minutiae matching process) to further enhance the accuracy of the overall matching process.

Verification station 150 is used to verify matching results, for instance visually. The search results are generally the ordered list output from the enhanced matcher processor(s) 130. Accordingly, verification station 150 may be equipped with a suitable display device (for instance a computer display) for displaying a search print from the search record and one or more candidate file prints from one or more candidate file records for manual examination. Moreover, it is appreciated by those of ordinary skill in the art that although input and enrollment station 140 and verification station 150 are shown as separate boxes in system 10, these two stations may be combined into one station in an alternative embodiment.

In operation, the distributed matcher controller 110 controls the fingerprint identification system 10 from a system level and in a ten-print matching operation, from a record level. Accordingly, distributed matcher controller 110 receives the active search record from the input and enrollment station 140 and retrieves the active file records from the active file database stored in the data storage and retrieval unit 100. Controller 110 then distributes the active search and relevant file records to the adaptive minutiae matcher processor(s) 120 and if necessary to the enhanced matcher processor(s) 130 for performing their respective matching processing one finger at a time, wherein the controller 110 collects the match reports after each finger match is completed. The results of each finger match is evaluated by one or more intelligent decision logic, typically in the distributed matcher controller 110, to determine whether or not a hit is found, and if a strong hit, for instance, is found the search may be completed.

The intelligent decision logic (IDL) algorithms utilize the foregoing features. First, IDL may determine the number of potential hits for each selected finger and then make a record level decision based on individual finger hits status with record level features. The record level decision provides the number of identified match "hits" found for the search and the strength of each hit. Based on the strength of the hit, a more detailed match may be used to search these records again. If a strong hit is found, the search may be ended. After the detailed match, the results are re-evaluated by IDL. In this way, the number of candidate file prints for visual verification is reduced and the search response time is improved. Since the decision is made in multi-level stages and more orthogonal features are used in the latter stages, the identification accuracy is also improved. The decision system may be configured, for example, to include three modules: minutiae matcher results evaluation logic, i.e., IDL1; secondary or enhanced matcher results evaluation logic, i.e., IDL2; and hybrid weak hits evaluation logic module, i.e., IDL3.

In an exemplary embodiment, intelligent decision logic modules may be used to progressively provide data regarding matched scores of records to determine whether the match of two records, for example in a ten-print to ten-print search, is mated (a "HIT") or is non-mated (a "NO HIT"). In addition to a record identification metric, the decision logic algorithm may be configured to provide inter alia an analysis of the accuracy of the match or "HIT" (i.e., the strength of the match). A strong match (or "STRONG HIT") may be provided to users without fingerprint expert verification, while a weak match may be submitted to the enhanced matcher processor(s), for instance, for further processing. The strongly identified candidates ("strong hits") are those with input features greater than their respective thresholds $T_h$. The weakly identified candidates ("weak hits") are those with input features between threshold $T_L$ and $T_h$ respectively.

IDL2 may be further configured to provide a record identification metric that may be processed to determine the accuracy (i.e., strength) of the resulting most probable matches returned from the enhanced matcher processor(s). Depending on, for example, the strength of the results, the strong matched candidates may then be provided to users without fingerprint expert verification or to IDL3. The results of IDL3 may be determined as weak or strong matched candidates, wherein strong matched candidates may be subsequently provided to users without fingerprint expert verification while identified weak matched candidates are typically provided for fingerprint expert examination.

Using AFIS 10 and based on the logic module(s), a progressive down-selection fingerprint identification process may be performed. The process may begin with a filtering process or stage applied to a plurality of file records from database 100. At this stage, the plurality of file records is ideally reduced to a smaller filtered subset of the plurality of file records to be provided for further processing in the adaptive minutiae matcher processor(s), i.e., the minutiae matching stage.

This filtering process may be a classification filtering process comprising, for example, a mega-feature filter, wherein a file record may be selected for inclusion in the filtered subset based upon, for example, the number of search fingerprints in a search record having at least one matching mega-feature with corresponding file fingerprints in the file record. The size of the filtered subset of file records selected depends on the selectivity and reliability of the designed filter and the speed and accuracy requirement of the overall system. Exemplary mega-features that may be used in this filtering/matching stage are pattern classification type, a core-to-delta distance, and a core-to-delta ridge count. Those of ordinary skill in the art will realize that additional mega-features may be used in this filtering stage.

The filtered subset of file records is sent to the adaptive minutiae matching processor(s), and more particularly the registration stage, thereof, for further filtering. This stage may be considered a filtering stage since no intelligent decision logic is utilized therein. Once the mated minutiae is determined for each finger considered for the search record (as compared to each file record in the filtered subset), this information may be categorized as, for example, an average number of mated minutiae at the record level and a maximum number of mated minutiae at the finger level. In one implementation, those file records that when compared to the search record have an average number of mated minutiae that is at least equal to a threshold may be included in a set of candidate file records that are considered as possible matches with the search record. In another implementation, those file records that when compared to the search record have an absolute number of mated minutiae for the record or for at least one finger that is at least equal to another threshold may be included in the set of candidate file records. By changing the scale of the thresholds, the number of candidates for the later stage matching is regulated. This directly affects the accuracy and speed of the system.

This set of candidate file records is ideally what is presented to the scoring stage of the adaptive minutiae matching stage. Using this set of candidate records, the search may be carried out by using relatively fast minutiae matchers with the matched scores and the features mentioned in previous section provided, for example, to IDL1 for analysis. If only strong hits result, then the identified candidates may be returned to the user without a fingerprint expert verification; if not, a slower, more detailed secondary match of the top M candidates may be performed.

The matched scores may then be returned back to IDL2 for analysis. If all hits are strong hits, then the identified strong hits candidates may be returned to the user without a fingerprint expert verification; if not, the IDL1 and IDL2 results may be provided to IDL3 for further analysis. In IDL3, weak hits may be promoted or demoted according to a set of criteria. If strong hit candidates are found, the case may be returned to the user without fingerprint expert verification; if not and weak hit candidates are found, the weak hit candidates may be returned to a fingerprint examiner to review. If neither strong nor weak hit candidates are found, a non-identification (or "no hit") for the search record in the database may be declared.

As discussed earlier, the number of fingers used in the above-described fingerprint identification process is an important factor in the speed, cost and accuracy of a fingerprint identification system. The various teaching of the present invention described below provide for optimal selection of a number of fingers for each matching stage in the fingerprint identification process.

Figure 2:
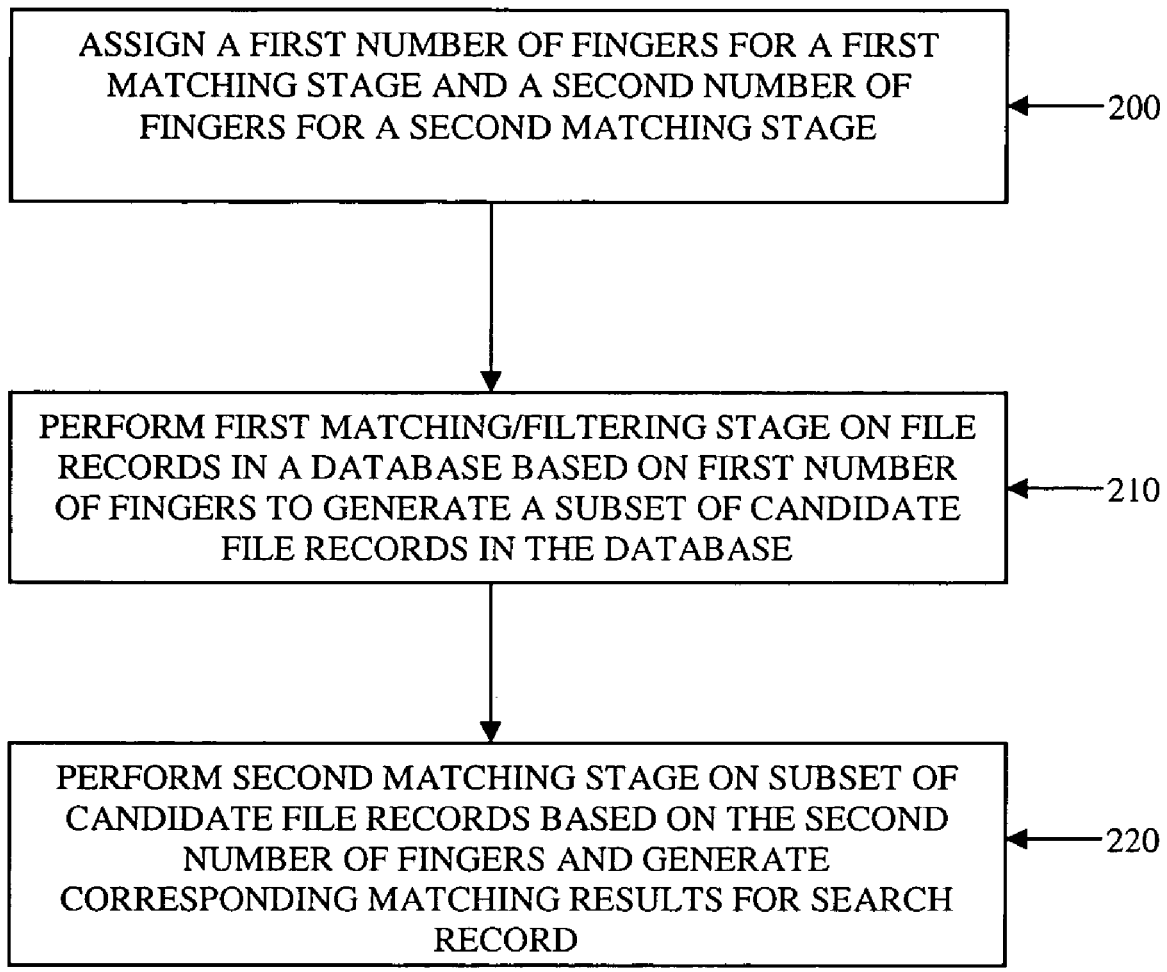
FIG. 2 illustrates a flow diagram of a method in accordance with an embodiment of the present invention.

In FIG. 2 a flow diagram of a method for fingerprint matching in accordance with an embodiment of the present invention is shown and indicated generally. In this general implementation, only two matching stages are used. Accordingly, a first number of fingers for the first matching stage and a second number of fingers for the second matching stage are assigned (200). The first matching stage is performed (210) based on the first number of assigned fingers, which includes comparing the search record having a set of search fingerprints to at least a portion of a plurality of file records in the database and generating (210) first matching results comprising a first set of N candidate records that includes a subset of the at least a portion of the plurality of file records. The number of N candidate records can be regulated according to the accuracy and speed requirement of the designed system. The second matching stage is performed (220) based on the second number of assigned fingers, which includes comparing the search record to at least a portion of the first set of candidate records and generating (220) second matching results comprising one of: a strong hit; a weak hit; no hit; and a second set of candidate records that includes an ordered portion of the first set of candidate records, which can, for instance, be visually examined by a user.

In the first stage matching, ideally a fewer number of fingers is assigned, for instance two fingers. Therefore, in the second stage of matching a much greater number of fingers can be used, for instance ten fingers, without causing the accuracy of the matching process to suffer. Fewer fingers used in the first stage matching and the smaller number of "N" candidates matched in the second stage reduces the total number of prints matched for a given search. Moreover, since the greater number of fingers used in the second stage minutiae matching provides orthogonal information, even if the second stage matching uses the same type of matching process as stage one, it increases the accuracy. Thus, using more fingers in the second stage matching could compensate for any accuracy loss caused by the lower number of fingers used in the first stage matching. By correctly selecting the N and the number of fingers used in the first and second stage matching, the accuracy may be slightly improved while decreasing the cost of the system because of the fewer number of prints being matched overall.

Typically the main cost of a fingerprint identification system is in the first stage matching because of the number of comparisons that need to be performed. If we are able to reduce the cost in the first stage matching, overall system cost should be reduced. Accordingly, a simplified minutiae matcher algorithm in a hardware implementation, for instance, can be used to further improve the speed. This simplified minutiae matcher may be, for example, the registration stage of an adaptive minutiae matcher processor(s), since it performs like a filter. The number of candidates provided to the second stage minutiae matcher is also reduced by the filtering result of the registration. An adaptive minutiae matcher can be used for the second stage matching. Moreover, the matching time in the second stage can also be further reduced since some fingerprint registration is performed in the first stage matching for the first number of fingers. The information such as mated minutiae for the first number of fingers can be passed to the second stage so that the registration for these fingers does not need to be re-done. Only scoring for these fingers will need to be performed. Thus, only the remaining fingers in the second number of fingers will require both registration and scoring in the second stage. In this way, the total matching time is reduced.

There is a limitation on the proposed method when the quality of all fingers used is poor. A mated candidate may have less chance to be in the candidate list using a smaller number of fingers in the first stage when the quality of the selected search images and the corresponding mated file images are poor. With the speed dramatically increased, by selecting a few more fingers for the poor quality search cases, overall speed performance of the system should not be damaged. Thus, a dynamic finger selection algorithm can be implemented to solve the drawback of always using the same number of fixed fingers.

Figure 3:
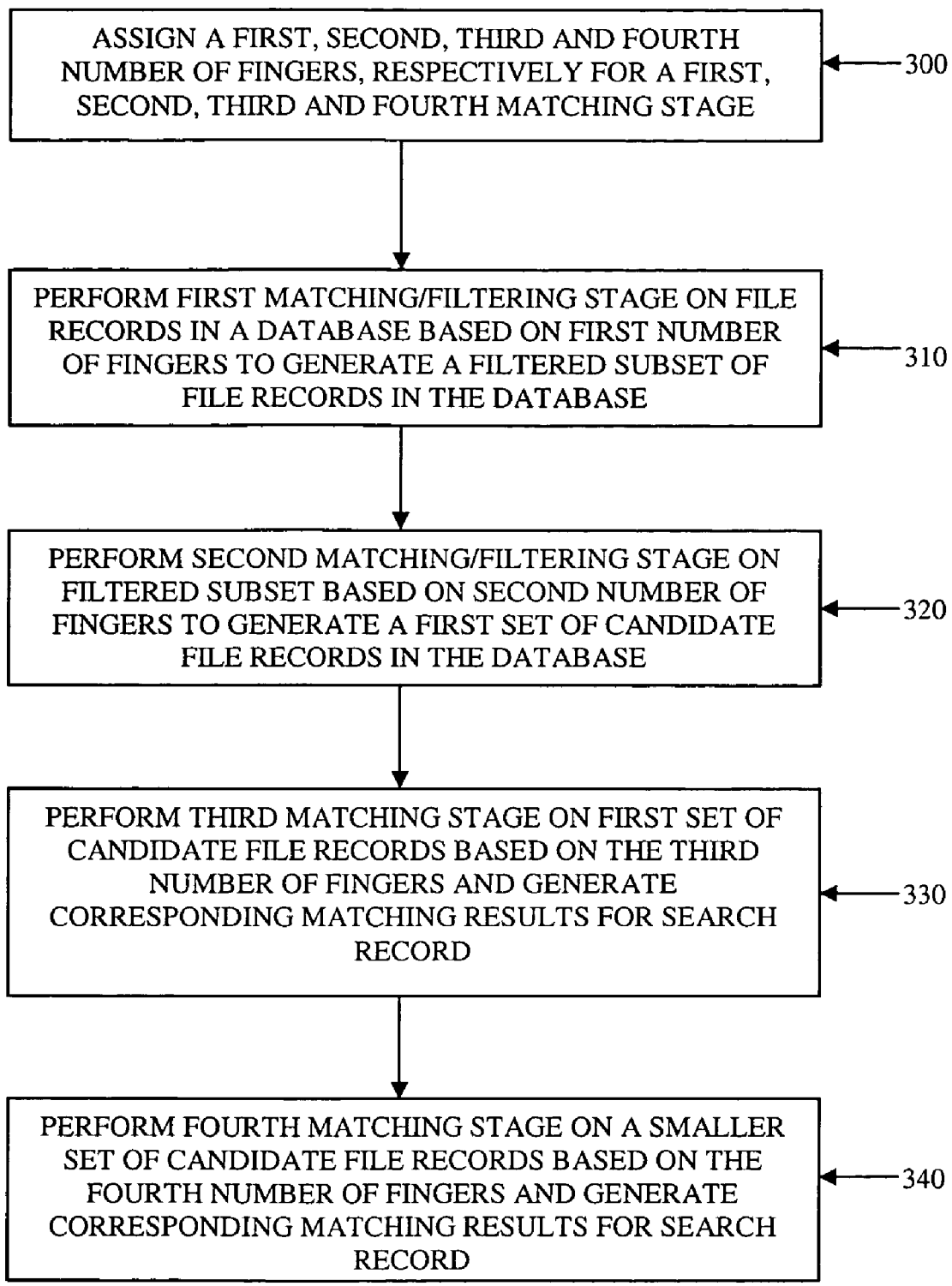
FIG. 3 illustrates a flow diagram of a method in accordance with another embodiment of the present invention.

In FIG. 3, a flow diagram of a method for fingerprint matching in accordance with another embodiment of the present invention is shown and indicated generally. In this implementation, four matching stages are used. It should be realized by those of ordinary skill in the art that the various teachings of the present invention does not depend on the number of matching stages used and that any number of matching stages may be used. In FIG. 3, the two matching stages of FIG. 2 are used (320, 330) in addition to a high level filter matching stage (310) such as the mega-feature filter discussed above, and an enhanced matching stage (340) may be used if necessary as discussed above. A different number of fingers is also assigned (300) to each of these two additional matching stages.

Ideally, the number of fingers assigned to the mega-feature filtering stage is ten fingers because this stage is such a fast and relatively simple matching stage. The number of fingers assigned to the third and fourth matching stages (e.g., the adaptive minutiae matcher and enhanced matching stages) is ideally more than the number of fingers assigned to the second filter/registration matching stage, with the number of fingers in the final stage ideally being the most since fewer matches are performed and additional orthogonal information is gained to increase the overall accuracy of the search. Moreover, the number candidates are reduced after each stage of matching.

The number of fingers in each of the stages is determined based at least on the quality of the search prints and the file prints (wherein the number of fingers assigned is inversely related to the quality of the search prints and the file prints). The number of fingers is also assigned to achieve an accuracy requirement for the system, for instance a desired true acceptance rate (TAR) and false acceptance rate (FAR). The number of fingers assigned is further based on the accuracy of the matchers used to performed the matching stages, which can be determined off-line and is typically fixed for a given matcher apparatus.

Given that the number of fingers assigned for each stage may be determined based on the quality of the fingerprints and records used in the search, the accuracy and speed of the system can be optimized by using a process, such as is described below, for diving the search and file prints and records into clusters based upon the quality of the prints in those records. Accordingly, upon receipt of the active search record, the distributed matcher controller 110 may obtain accuracy requirements for the search results and generate from the active search record at least one quality cluster for a total of "n" number of different hierarchical quality clusters, wherein each quality cluster is defined based on a different desired minimum quality level, and prints associated with that cluster have a quality at least equal to the minimum quality of the corresponding cluster. Furthermore, to achieve, for instance a customer's, accuracy requirements a number of fingers are assigned to each quality cluster for the purpose of performing the matching process. Finger assignment guidelines may be determined off-line as a function of the particular accuracy characteristics of the AFIS system being used to perform the matching process and may be stored, for instance, in an accuracy table in the data storage and retrieval device 100.

Images that fall within the range of quality for a given level are included in that cluster. Accordingly, quality levels are determined based on the premise that the matching accuracy is similar for the images having the same level of quality. For instance, let us assume the value of image quality is ranged from 0 to 100, wherein 0 means worst quality and 100 means best quality. The value range may then be further quantized into "n" levels according to the matching rate. Let's assume "n" is 4, wherein each quality level, is named "A", "B", "C" and "D" respectively. The range for each level may then be selected such that the matching accuracy is similar for that level. For instance, the range for levels A, B, C and D, respectively, may be selected as 80 to 100, 60 to 80, 40 to 60 and 0 to 40. Thus, all print images having at least a quality that falls within the range assigned to the A level are included in the A cluster, and all the print images having A level or B level are included in the B cluster and so on for C and D. The clusters are hierarchical in the sense that the cluster B includes the images in the cluster A, and the cluster C includes the images in the cluster B, which already includes the images in the cluster A, etc.

When all of the print images from the search record have been assigned to quality clusters, the images from the A quality cluster should have a higher accuracy rate than the B, C or D quality clusters. By the same token, the images from the B quality cluster should have a higher accuracy rate than the C or D quality clusters, and so on. In other words, the A quality cluster images will require fewer fingers for matching than the B, C or D quality clusters to achieve the same accuracy. Thus, by dividing each record into different quality cluster of images, a different number of fingers can be assigned to each cluster to achieve a desired balance between accuracy and speed.

Once the prints have been organized into the quality clusters, the distributed matcher controller 110 then generates at least one search packet (also referred to herein as a search package) within each quality cluster, each said search packet having a dynamically determined set of prints. The set includes the number of prints assigned to the corresponding quality cluster and includes only those fingers in the search record having at least the desired minimum quality. A total of "m" search packages may be generated across all of the "n" clusters, wherein all possible different finger number combinations for a given number of fingers associated with each quality cluster are formed as search packages.

Simply matching the search packages against the entire database will not achieve the desired accuracy requirements. Instead, to achieve the accuracy requirements, each search packet must be searched against file records having prints, i.e. file prints, which are of a quality at least equal to that of the prints in the search packet (i.e., at least equal to the minimum quality level of a corresponding quality cluster) and including at least the fingers included in the corresponding search record. Thus, the distributed matcher controller 110 dynamically retrieves the file records according to each search package. In this way, the file database is virtually divided into some virtual file bins corresponding to the number of search packages, wherein the prints in each search packet have a similar desired quality to the corresponding prints in its corresponding virtual file bin, and there are corresponding fingers between the two.

Ideally, the file database is a filtered file database such as, for instance, an active file database having active file records, such as is described above. In addition, each file record ideally includes ten prints although a given file record may contain fewer prints. Moreover, to increase the speed of the matching process, ideally each virtual file bin contains file records that are exclusive of those file records contained in any of the other virtual file bins. In other words, once a no hit is found for a given file record, that file record is not matched against any other search package. This is possible because where a no hit is found for a given file record against a search package of a given quality, one can be correspondingly certain to a degree of accuracy required by the customer that the person associated with that file record is not the same person as the one associated with the search record. Thus, organizing the active search record in the manner described above, and performing the matching process of the search record against the active file database partitioned as described above enables the system and method of the present invention to achieve substantially greater accuracy and speed over prior art systems.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A method for fingerprint record identification comprising the steps of:

assigning a first number of fingers for a first matching stage, a second number of fingers for a second matching stage, a third number of fingers for a third matching stage, and a fourth number of fingers for a fourth matching stage;

performing the first matching stage comprising comparing, based on the assigned first number of fingers, a search record having a set of search fingerprints to a plurality of file records each having a set of file fingerprints in a database and generating first matching results comprising a filtered subset of the plurality of file records;

performing the second matching stage comprising comparing, based on the assigned second number of fingers wherein the assigned second number of fingers is less than the assigned third and the assigned fourth number of fingers, the search record to the filtered subset and generating second matching results comprising a first set of candidate records that includes a subset of the filtered subset;

performing the third matching stage comprising comparing, based on the assigned third number of fingers, the search record to at least a portion of the first set of candidate records and generating third matching results comprising one of: a strong hit; a weak hit; no hit; and a second set of candidate records that includes an ordered portion of the first set of candidate records; and when the third matching results comprises the ordered portion of the first set of candidate records, performing the fourth matching stage comprising comparing, based on the assigned fourth number of fingers, the search record to the second set of candidate records and generating fourth matching results comprising one of: a strong hit; a weak hit; no hit; and a third set of candidate records that includes an ordered portion of the second set of candidate records.

2. A method for fingerprint record identification comprising the steps of:

assigning a first number of fingers for a first minutiae matching stage, a second number of fingers for a second minutiae matching stage, a third number of fingers for a third matching stage, and a fourth number of fingers for a fourth matching stage, wherein the assigned first and the assigned second number of fingers is less than the assigned fourth number of fingers;

performing the first minutiae matching stage comprising comparing, based on the assigned first number of fingers, a search record having a plurality of search fingerprints to at least a portion of a plurality of file records each having a plurality of file fingerprints in a database and generating first matching results comprising a first set of candidate records that includes a subset of the at least a portion of the plurality of file records;

performing the second minutiae matching stage comprising comparing, based on the assigned second number of fingers, the search record to at least a portion of the first set of candidate records and generating second matching results comprising one of: a strong hit; a weak hit; no hit; and a second set of candidate records that include an ordered portion of the first set of candidate records;

performing the third matching stage comprising comparing, based on the assigned third number of fingers, the search record to the plurality of file records in the database and generating third matching results comprising a filtered subset of the plurality of file records, wherein in the first minutiae matching stage the search record is compared to the filtered subset and the first set of candidate records includes a subset of the filtered subset; and performing the fourth matching stage comprising comparing, based on the assigned fourth number of fingers, the search record to the second set of candidate records and generating fourth matching results comprising one of: a strong hit; a weak hit; no hit; and a third set of candidate records that includes an ordered portion of the second set of candidate records.

3. The method of claim 2, wherein the first, second, third and fourth number of fingers are assigned to satisfy an accuracy requirement.

4. The method of claim 3, wherein the accuracy requirement is a predefined true acceptance rate and a predetermined false acceptance rate.

5. The method of claim 2, wherein: the assigned third number of fingers is ten fingers and the third matching stage comprises a mega-feature filter.

6. The method of claim 5, wherein a file record is selected for the filtered subset based on the number of search fingerprints in the search record having at least one matching mega-feature with the corresponding file fingerprints in the file record.

7. The method of claim 6, wherein the at least one matching mega-feature is selected from a group comprising: a pattern classification type, a core to delta distance, and a core to delta ridge count.

8. The method of claim 2, wherein the first matching stage includes determining, for each finger in the assigned first number of fingers and for each file record in the at least a portion of the plurality of file records in the database, mated minutiae pairs between a search fingerprint and a corresponding file fingerprint.

9. The method of claim 8, wherein a file record is selected for the first set of candidate records based on the file record and the search record, for the assigned first number of fingers, having at least one of: an average number of mated minutiae pairs that is at least equal to a first threshold, and an absolute number of mated minutiae pairs that is at least equal to a second threshold.

10. The method of claim 2, wherein the assigned first number of fingers is less than the assigned second number of fingers, and the second matching stage includes determining, for each finger in the assigned second number of fingers that is not included in the assigned first number of fingers and for each file record in the first set of candidate records, mated minutiae pairs between a search fingerprint and a corresponding file fingerprint.

11. The method of claim 10, wherein the second stage matching further includes determining, for each finger in the assigned second number of fingers, a score for each mated minutiae pair based on the number of neighboring search minutiae that also have a mated file minutiae.

12. The method of claim 2, wherein:
the assigned fourth number of fingers is more than the assigned second number of fingers;
the second matching stage comprises a coarse minutiae matching stage; and
the fourth matching stage comprises an enhanced matching stage.

13. The method of claim 2, wherein the first and the second number of fingers are assigned based on the quality of the fingerprint records in the plurality.

14. The method of claim 13, wherein the assigned first and the assigned second number of fingers are inversely related to the quality of the fingerprint records in the plurality.

15. The method of claim 2, wherein:
the first number of fingers is assigned based on a predetermined accuracy of first matcher apparatus configured for performing the first matching stage; and
the second number of fingers is assigned based on a predetermined accuracy of second matcher apparatus configured for performing the second matching stage.

* * * * *